United States Patent Office 2,732,306
Patented Jan. 24, 1956

2,732,306
MALT BEVERAGE

Arnold S. Wahl, Chicago, Ill.

No Drawing. Application June 17, 1954,
Serial No. 437,579

13 Claims. (Cl. 99—48)

This invention relates to a method of treating acid aqueous media which are substantially fat-free. More particularly, it relates to the treatment of beer and other malt beverages.

Beer and other malt beverages tend to acquire undesirable odors and tastes during the handling thereof and during storage. The acquisition of these undesirable tastes and odors results from one or more of several recognized factors. Beer for example acquires an odor commonly known as "skunky" when placed in a strong light such as ordinary sunlight. Pasteurization of beer can also cause undesirable tastes and odors, particularly when the temperature during pasteurization rises higher than 140° F. Aging of beer in bottles causes other disagreeable odors and tastes which are produced by the chemical reaction of certain components of the beer with atmospheric oxygen sealed in the bottle with the beer. This oxygen is believed to oxidize these components to compounds possessing the unpleasant odors and tastes that cause these types of off flavors in beer.

The development of the above described off flavors and undesirable odors can be largely prevented by adding to the malt beverage an anti-oxidant selected from the group consisting of guaiaretic acid, nordihydroguaiaretic acid and homologues of nordihydroguaiaretic acid. However, because of the very limited solubility of guaiaretic acid, nordihydroguaiaretic acid or homologues of nordihydroguaiaretic acid in substantially fat-free acid aqueous media such as beer it is difficult to add these anti-oxidants and distribute them uniformly in media, such as beer, in the amounts which exert effective protection against the development of the above described off flavors and undesirable odors. Furthermore, the amount of the anti-oxidant required to exert the desired protective effect depends on the Balling value of the beer and in general the amount of anti-oxidant required increases as the density of the beer increases. The larger amounts of anti-oxidant are increasingly difficult to distribute uniformly in the beer.

Accordingly it is an object of this invention to provide an improved method of adding anti-oxidants of the type set forth above to substantially fat free acid aqueous media, such as malt beverages, particularly beer.

More specifically it is an object of this invention to provide an improved method of adding anti-oxidants of the type set forth above to beer and other malt beverages to prevent the development of off flavors and disagreeable odors therein.

Another object of the invention is to provide a method of adding anti-oxidants of the type set forth above to substantially fat free acid aqueous media, such as malt beverages, particularly beer, so that the anti-oxidant is more completely dissolved and uniformly distributed and is therefore more effective in use.

A further object of the invention is to provide a method of adding anti-oxidants of the type set forth above to substantially fat free acid aqueous media, such as malt beverages, particularly beer, by means of which the anti-oxidant is more effectively utilized whereby a smaller amount of the anti-oxidant is required to obtain the desired protective effect.

It has now been found that these and other objects and advantages of the invention are obtained by adding to substantially fat free acid aqueous media, such as malt beverages, particularly beer, an aqueous solution comprising an anti-oxidant selected from the group consisting of guaiaretic acid, nordihydroguaiaretic acid and homologues of nordihydroguaiaretic acid in the form of a salt soluble in the aqueous solution. Preferably, the aqueous solution is prepared by dissolving the anti-oxidant in the form of the free acid in an aqueous solution of a base of a type and in a quantity such that it converts the anti-oxidant into a salt which is soluble in the aqueous solution and preferably such solution of the anti-oxidant is prepared just before it is added to the substantially fat free acid aqueous medium because of the instability of the salts of the anti-oxidant in solution in aqueous media.

Although the present invention has application and benefits when used with all substantially fat free acid aqueous media which are to be treated with anti-oxidants of the types set forth, it has particular application to malt beverages and particularly to beer. Accordingly the invention will be described in detail as applied to beer and particularly to beer having a density of 13 Balling or greater. This is to be construed only as being illustrative and not as a limitation of the invention.

When nordihydroguaiaretic acid is used as an anti-oxidant in beer 10 parts by weight of the anti-oxidant to 1,000,000 parts by weight in beer will give protection provided that the anti-oxidant is dissolved in the beer and is not destroyed when added to the beer through chemical reactions. When completely dissolved even smaller amounts of anti-oxidant may be used and up to as much as 100 parts by weight or more of anti-oxidant may be used if desirable. It has further been found that the basic aqueous solution of the anti-oxidant is more effective if it has incorporated therein a quantity of potassium metabisulfite.

In order to disclose the invention more clearly, the following example is given by way of illustration and is not to be construed as a limitation of the invention.

*Example*

A 3% aqueous solution of sodium hydroxide is prepared. To 6½ liters of the 3% sodium hydroxide solution are added 175 gm. of potassium metabisulfite. Just before it is desired to treat the beer one pound of nordihydroguaiaretic crystals are added to the aqueous solution and the solution is stirred until all of the crystals are dissolved. The solution becomes a bright wine red color as the nordihydroguaiaretic acid is added and dissolved. The resultant solution is immediately mixed with 5 gallons of additional water and then added directly and immediately to 400 barrels of beer having a density of 13 Balling. The beer is circulated five hours to assure uniform distribution and is carbonated during the circulation. The resultant beer mixture is the usual color, the red color of the anti-oxidant solution having been completely dissipated. The concentration of anti-oxidant in the treated beer is 10 parts of nordihydroguaiaretic acid by weight to 1,000,000 parts by weight of beer.

Nordihydroguaiaretic acid has been synthesized from guaiaretic acid. However, the nordihydroguaiaretic acid derived from plants is preferred. The compound is present in a common desert plant, the creosote bush (Larrea Divaricata), which grows in the southwestern part of the United States. The preferred compound is that prepared by crystallization of a crude extract of this plant material. A preferred brand is known by the trade name "N. D. G. A." supplied by Wm. J. Stange Co. of Chicago, Illinois.

The following chemical formula has been assigned to the active ingredient, nordihydroguaiaretic acid:

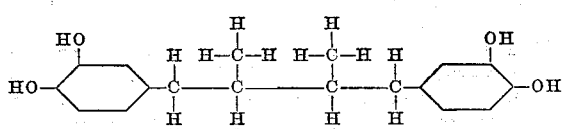

Extensive toxicity experiments conducted over several years indicate that nordihydroguaiaretic acid is entirely harmless to human beings when taken internally in amounts far in excess to that required to carry out the present invention.

Instead of sodium hydroxide any other base may be used which forms a salt with the anti-oxidant being used, provided the salt of the anti-oxidant is sufficiently soluble in aqueous solutions. In the case of nordihydroguaiaretic acid another example of such a base is potassium hydroxide.

A 3% solution of sodium hydroxide is required to dissolve one pound of nordihydroguaiaretic acid in 6½ liters of base solution. The concentration of sodium hydroxide in the solution may be increased if desired and in the case of other types of anti-oxidants could be increased or decreased. The potassium metabisulfite is a reducing agent and serves to protect the nordihydroguaiaretic acid from decomposition while it is in solution. Other metabisulfites such as sodium metabisulfite may be used.

Although the solution containing sodium hydroxide and potassium metabisulfite can be stored substantially indefinitely it is preferred that the anti-oxidants be added just before it is desired to treat the beer. The nordihydroguaiaretic tends to decompose in the sodium hydroxide solution even in the presence of the protective action of the potassium metabisulfite.

Beer normally has pH in the acid range. The nordihydroguaiaretic acid is in the form of its sodium salt in the prepared anti-oxidant solution. Due to the much larger volume of beer the final treated beer solution will still be acid in character and the salt of the nordihydroguaiaretic acid will be converted to a solution of nordihydroguaiaretic acid. The effectiveness of the anti-oxidant is greatly increased when it is in solution and accordingly greater protective action is afforded by a given amount of anti-oxidant and in certain cases smaller amounts of anti-oxidant may be used to obtain satisfactory protection of the beer.

Another advantage is obtained from the present invention in that the pH of the treated beer is slightly increased. Beer as brewed is normally too tart. It is difficult to prevent the formation of the acid constituents in beer and the yeast uses up any alkali that is present. The addition of the base solution reduces the acidity and tartness of the beer and produces in general a more palatable and more desirable product.

The anti-oxidant solution may be added to the beer at any time after fermentation. Good results are obtained when it is introduced into the beer as near to the final filtration as is practicable. The preferred point of addition is in the lines that carry the beer to the bottling tanks. From a practical brewing standpoint the anti-oxidant solution is added in a stream by injecting it into the beer stream when the beer is traveling from the finishing tanks to the bottling tanks. The final filtration is performed here and any nordihydroguaiaretic acid suspensoids that adhere to the filter will be dissolved as a large volume of beer passes through.

The amount of anti-oxidant in the beer may be readily controlled by varying the rate of addition of the anti-oxidant solution to the beer stream. Preferably a synchronized addition of the anti-oxidant solution to a flowing beer stream is used. It is to be understood however that other suitable systems of mixing the anti-oxidant solution with the beer can be utilized.

Further benefits can be derived by incorporating anisole (methoxybenzene) in the anti-oxidant solution. The anisole aids in preventing oxidation and it has been found that the anisole and the nordihydroguaiaretic acid exert a synergistic effect on each other. Instead of anisole various derivatives thereof, such as butylated hydroxy anisole, may be used.

It will be seen that there has been provided a method of introducing an anti-oxidant solution into substantially fat-free acid aqueous media in such a manner that the anti-oxidant is preserved and is more fully dissolved thereby increasing its beneficial action. This method of adding the anti-oxidant makes it possible to treat successfully solutions such as beer having a density of 13 Balling or greater with only 10 p. p. m. or less of nordihydroguaiaretic acid.

Although certain examples have been given for purposes of illustration it is to be understood that various changes and modifications can be made therein without departing from the spirit and scope of the present invention. Accordingly the invention is to be limited only as set forth in the following claims.

I claim:

1. The method of treating a malt beverage comprising adding thereto a solution including an anti-oxidant selected from the group consisting of guaiaretic acid, nordihydroguaiaretic acid and homologues of nordihydroguaiaretic acid, a water soluble metabisulfite and a base that forms a salt of an anti-oxidant which is soluble in aqueous solutions.

2. The method as set forth in claim 1 wherein the base is sodium hydroxide.

3. The method as set forth in claim 1 wherein the metabisulfite is potassium metabisulfite.

4. The method of treating a malt beverage comprising the steps in forming a basic solution including an anti-oxidant selected from the group consisting of guaiaretic acid, nordihydroguaiaretic acid and homologues of nordihydroguaiaretic acid and a base that forms a salt of the anti-oxidant which is soluble in aqueous solutions, and adding the anti-oxidant solution of the malt beverage after fermentation.

5. The method of treating a malt beverage comprising the steps of preparing a basic solution including nordihydroguaiaretic acid and sodium hydroxide, and adding said basic solution to the malt beverage after fermentation.

6. The method of treating a malt beverage comprising the steps of forming a basic aqueous solution including nordihydroguaiaretic acid, potassium metabisulfite and sodium hydroxide, and adding said basic solution to the malt beverage after fermentation.

7. The method as set forth in claim 5 wherein the solution is added at a rate so that nordihydroguaiaretic acid is present from about 10 parts to about 100 parts per 1,000,000 by weight of the malt beverage.

8. The method as set forth in claim 5 wherein the anti-oxidant solution contains about 3% sodium hydroxide by weight.

9. The method of treating beer having a density of at least 13 Balling comprising the steps of preparing a basic aqueous solution including nordihydroguaiaretic acid, potassium metabisulfite and sodium hydroxide, and adding the anti-oxidant solution to the beer after fermentation.

10. The method of treating a malt beverage comprising the steps of adding thereto a basic aqueous solution including an anti-oxidant selected from the group consisting of guaiaretic acid, nordihydroguaiaretic acid and homologues of nordihydroguaiaretic acid, and a base that forms a salt of the anti-oxidant which is soluble in aqueous solutions.

11. The method of treating malt beverages as set forth in claim 10 wherein the base is sodium hydroxide.

12. The method of treating a malt beverage comprising the steps of adding thereto a basic aqueous solution including an anti-oxidant selected from the group consisting of guaiaretic acid, nordihydroguaiaretic acid and homologues of nordihydroguaiaretic acid, butylated hydroxy anisole, and a base that forms a salt of the anti-oxidant which is soluble in aqueous solutions.

13. The method as set forth in claim 12 wherein the base is sodium hydroxide.

References Cited in the file of this patent

UNITED STATES PATENTS

| | | |
|---|---|---|
| 1,390,711 | Heuser | Sept. 13, 1921 |
| 2,159,985 | Gray et al. | May 30, 1939 |
| 2,373,192 | Lauer | Apr. 10, 1945 |
| 2,377,031 | Norris | May 29, 1945 |
| 2,397,920 | Coe, Jr., et al. | Apr. 9, 1946 |
| 2,433,411 | Wallerstein | Dec. 30, 1947 |

FOREIGN PATENTS

| | | |
|---|---|---|
| 389,192 | Canada | June 4, 1940 |